(12) United States Patent
Burcea

(10) Patent No.: US 9,453,909 B2
(45) Date of Patent: Sep. 27, 2016

(54) ULTRASONIC PULSE-ECHO RANGING DEVICE

(71) Applicant: Siemens Aktiengesellschaft, Munich (DE)

(72) Inventor: George Burcea, Ajax (CA)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/924,089

(22) Filed: Oct. 27, 2015

(65) Prior Publication Data

US 2016/0124079 A1  May 5, 2016

(30) Foreign Application Priority Data

Oct. 29, 2014  (EP) ..................................... 14190932

(51) Int. Cl.
| | |
|---|---|
| *G01S 7/521* | (2006.01) |
| *G01S 15/10* | (2006.01) |
| *B06B 1/02* | (2006.01) |
| *G01S 7/523* | (2006.01) |

(52) U.S. Cl.
CPC ............. *G01S 7/521* (2013.01); *B06B 1/0215* (2013.01); *G01S 7/523* (2013.01); *G01S 15/10* (2013.01); *B06B 2201/55* (2013.01)

(58) Field of Classification Search
CPC ........ G01S 7/521; G01S 7/523; G01S 15/10; B06B 2201/55; B06B 1/0215
See application file for complete search history.

(56) References Cited

U.S. PATENT DOCUMENTS

| | | | |
|---|---|---|---|
| 2,642,562 A | 6/1953 | Russell | |
| 3,102,991 A | 9/1963 | Hess | |
| 3,176,262 A * | 3/1965 | Ehrlich ................... | G01S 7/529 330/137 |
| 4,210,970 A | 7/1980 | Toubkin et al. | |
| 4,255,782 A * | 3/1981 | Joyce ................... | H02M 5/293 363/159 |
| 4,353,004 A * | 10/1982 | Kleinschmidt ......... | G01S 7/524 310/317 |
| 4,449,068 A * | 5/1984 | Johnson ................... | G01S 1/72 310/316.01 |
| 4,486,867 A * | 12/1984 | Hill .......................... | G01S 7/52 200/61.02 |
| 4,785,429 A * | 11/1988 | Folwell .................... | G01S 7/64 367/900 |
| 4,817,066 A * | 3/1989 | Takasugi ............. | G01S 7/52017 367/105 |
| 4,955,000 A * | 9/1990 | Nastrom .................. | G01S 15/74 367/117 |
| 5,267,219 A * | 11/1993 | Woodward .............. | G01S 7/526 367/903 |
| 5,347,495 A * | 9/1994 | Cherek .................. | B06B 1/0207 333/32 |
| 8,107,322 B2 * | 1/2012 | Reiche .................. | B06B 1/0215 367/135 |
| 2016/0124079 A1 * | 5/2016 | Burcea .................... | G01S 7/521 367/99 |

FOREIGN PATENT DOCUMENTS

| | | |
|---|---|---|
| EP | 3015879 A1 * | 5/2016 |
| JP | 2010158470 A | 7/2010 |

* cited by examiner

*Primary Examiner* — Daniel Pihulic
(74) *Attorney, Agent, or Firm* — Cozen O'Connor

(57) ABSTRACT

An ultrasonic pulse-echo ranging device includes a piezoelectric transducer, a transmitter, a receiver, a first transformer having a primary winding coupled to an output of the transmitter and a secondary winding connected to the transducer, and a second transformer having a primary winding coupled to an input of the receiver and a secondary winding connected to the transducer, where the secondary windings of the first and second transformers are in series with the transducer, a first switching element is parallel with the primary winding of the first transformer and controlled to short-circuit this primary winding when the receiver receives the signals from the transducer, and where a second switching element is parallel with the primary winding of the second transformer and controlled to short-circuit this primary winding of when the transmitter drives the transducer to optimize the signal transfer to and from the piezoelectric transducer.

4 Claims, 1 Drawing Sheet

ULTRASONIC PULSE-ECHO RANGING DEVICE

BACKGROUND OF THE INVENTION

1. Field of the Invention

The present invention relates to an ultrasonic pulse-echo ranging device.

2. Description of the Related Art

Pulse-echo ranging devices, such as time-of-flight ranging devices, are commonly used in level measurement applications for determining the distance to a target object (e.g., a reflective surface of a material in a container) by measuring how long it takes to receive reflected pulses or echoes after transmission of a sequence of energy pulses. Such devices typically use ultrasonic pulses or pulsed radar or microwave signals.

Generally, acoustic pulse-echo ranging systems include a transmitter that generates electrical pulses of high frequency to cause an electro-acoustic transducer to generate acoustic pulses. The same transducer is utilized to receive acoustic energy echoed from the target and to convert such energy into electrical signals that are applied to a receiver. An echo profile may be generated from the received signals by amplifying, filtering and envelope shaping, where at some point an analog-to-digital conversion is performed. Echo pulses are identified in the digital echo profile by a signal processor, and the distance or range of the target is calculated based on the transmit times of the transmitted energy pulses and the identified echo pulses. The calculated distance or range is then transmitted over a communication bus to a process control system using a communications protocol.

From JP 2010-158470 A, an ultrasonic diagnostic apparatus for medical use is known. This conventional device comprises a piezo-electric transducer for emitting ultrasonic waves to a target and receiving echo waves reflected by the target, a transmitter having an output for driving the transducer, a receiver having an input for receiving signals from the transducer, a first transformer having a primary winding coupled to the output of the transmitter and a secondary winding connected to the transducer, and a second transformer having a primary winding coupled to the input of the receiver and a secondary winding connected to the transducer.

Here, the secondary windings of the first and second transformers are connected in parallel.

In level measurement applications, the acoustic wave propagation is affected by attenuation that increases with distance. When the measurement range (distance) is large, the strong attenuation of the echo makes it un-detectable from the ambient noise. Thus, if the conventional device is used for ultrasonic level measurement and an attempt to step up the electrical signal in both directions is made, i.e., from the transmitter to the piezo-electric transducer and from the transducer to the receiver, then the receiver input would be exposed to very high voltage when exciting the transducer to transmit the ultrasonic pulse. This would require protection circuits such as limiters with high series impedance, which would also degrade the received signal. Additionally, the second transformer will have to be dimensioned to handle the amplitude of the transmit pulse. There might be other limitations arising from the fact that the secondary windings of the transformers are connected in parallel with the piezo-electric transducer when the high voltage excitation is applied.

SUMMARY OF THE INVENTION

In view of the foregoing, it is an object of the invention to overcome the prior art drawbacks and to optimize the signal transfer to and from a piezo-electric transducer.

These and other objects and advantages are achieved in accordance the invention with the invention by an ultrasonic pulse-echo ranging device in which the secondary windings of the first and second transformers are in series with the transducer, a first switching element is in parallel with the primary winding of the first transformer, where the first switching element is controlled to short-circuit the primary winding of the first transformer when the receiver is receiving the signals from the transducer, and a second switching element is in parallel with the primary winding of the second transformer, where the second switching element is controlled to short-circuit the primary winding of the second transformer when the transmitter is driving the transducer.

Here, the two transformers have their secondary windings in series and each transformer can be shorted out letting the other perform its function without restrictions. The short is reflected from the respective primary sides of the transformers, leaving in the circuit only a small impedance (mainly due to the leakage inductance and winding resistance). The electrical signal can be boosted or stepped up in both directions without exposing the receiver input to high voltage. There are no conflicting requirements and the two transformers can be designed for any desired voltage ratio. There is no need for a limiting circuit for high voltage protection that may degrade the received signal. The second receiving transformer is shorted when transmitting a pulse. As a result, the second receiving transformer is never exposed to high voltage and therefore can be very small in size.

The second switching element can be conveniently realized with a limiter, such as a pair of diodes arranged in a back-to-back manner also performing a limiter function for the input of the receiver though such limiting function is not needed when the transmitter is turned off and the second switching element is closed while the receiver is listening to signals from the transducer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be further described by way of a preferred example and with reference to the accompanying drawing, in which.

DETAILED DESCRIPTION OF THE EXEMPLARY EMBODIMENTS

Figure 1:
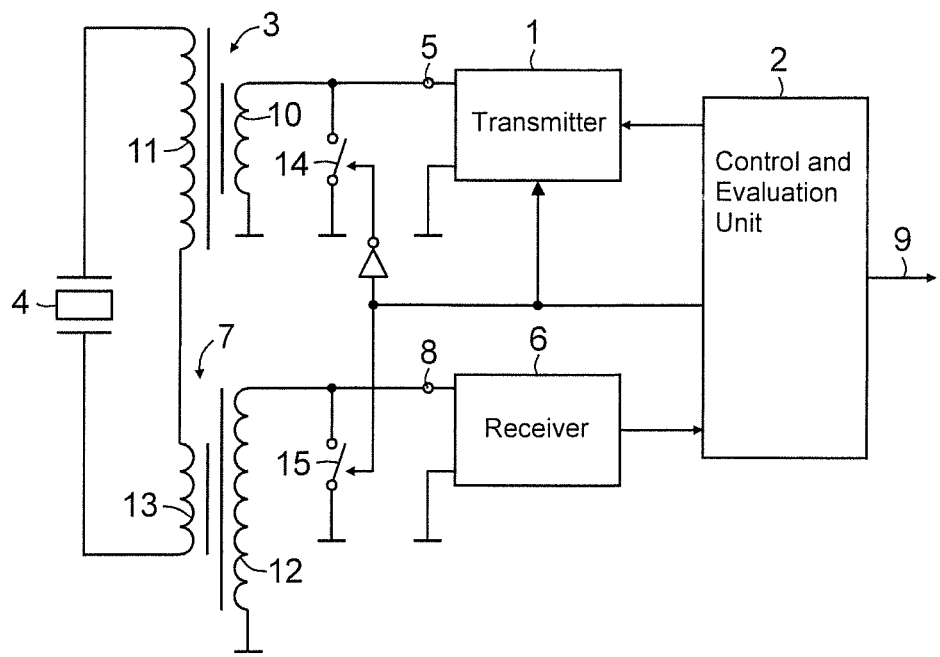
FIG. 1 is a schematic diagram of relevant portions of a pulse-echo ranging device incorporating the invention.

The ultrasonic pulse-echo ranging device schematically illustrated in FIG. 1, includes a transmitter 1, typically consisting of a single-ended or push-pull driver circuit switching a current supply on and off at a desired high operating frequency for the duration of a transmit pulse. The length of the pulse and its repetition rate is controlled by a control and evaluation unit 2. A first transformer 3 couples the transmitter 1 to a piezo-electric transducer 4. The transducer 4 is tuned to resonate at or near the operating frequency, and converts the high frequency electrical energy from an output 5 of the transmitter 1 into acoustic energy directed towards a target (not shown). A receiver 6 receives electrical signals that are converted by the transducer 4 from acoustic energy echoed from the target and are passed through a second transformer 7 to an input 8 of the receiver 6. An echo profile may be generated from the received signals by amplifying, filtering and envelope shaping, where at some point an analog-to-digital conversion is performed. Echo pulses are identified in the digital echo profile by the control and evaluation unit 2, and the distance or range of the target is calculated based on the transmit times of the transmitted energy pulses and the identified echo pulses. The calculated distance or range is then transmitted over a communication bus 9 to a process control system (not shown).

The first transformer 3 has a primary winding 10 coupled to the output 5 of the transmitter 1 and a secondary winding 11 connected to the piezo-electric transducer 4. The second transformer 7 has a primary winding 12 coupled to the input 8 of the receiver 6 and a secondary winding 13 connected in series with the secondary winding 11 of the first transformer 3 to the transducer 4.

In parallel with the primary winding 10 of the first transformer 3 is a first switching element 14 that is controlled by the control and evaluation unit 2 to short-circuit the primary winding 10 when the transmitter 1 is turned off and the receiver 6 is listening to signals from the transducer 4. A second switching element 15 is in parallel with the primary winding 12 of the second transformer 7 and is controlled to short-circuit the primary winding 12 of the second transformer 7 when the transmitter 1 is driving the transducer 4. The switching elements 14, 15 may be any type of semiconductor switches.

As an example, the operating frequency is between 10 kHz and 60 kHz, the first transformer 3 has a step-up ratio from the primary winding 10 to the secondary winding 11 of 1:12 or larger and the second transformer 7 allows an additional step-up of 1:3 to 1:10 from the secondary winding 13 to the primary winding 12.

Figure 2:
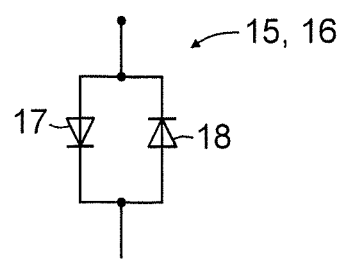
FIG. 2 shows an alternative example of the second switching element.

As FIG. 2 shows, the second switching element 15 may be a limiter such as a pair of diodes 16, 17 arranged in a back-to-back manner that is controlled by the high voltage appearing across the primary winding 12 of the second transformer 7 when the transmitter 1 is driving the transducer 4.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An ultrasonic pulse-echo ranging device comprising:
   a piezo-electric transducer configured to emit ultrasonic waves to a target and to receive echo waves reflected by the target;
   a transmitter having an output for driving the transducer;
   a receiver having an input for receiving signals from the transducer;
   a first transformer having a primary winding coupled to the output of the transmitter and a secondary winding connected to the transducer;
   a second transformer having a primary winding coupled to the input of the receiver and a secondary winding connected to the transducer, the secondary windings of the first and second transformers being in series with the transducer;
   a first switching element arranged in parallel with the primary winding of the first transformer, said first switching element being controlled to short-circuit the primary winding of the first transformer when the receiver is receiving the signals from the transducer; and
   a second switching element arranged in parallel with the primary winding of the second transformer, said second switching element being controlled to short-circuit the primary winding of the second transformer when the transmitter is driving the transducer.

2. The ultrasonic pulse-echo ranging device of claim 1, wherein the second switching element is a limiter that limits a high voltage appearing across the primary winding of the second transformer when the transmitter is driving the transducer.

3. The ultrasonic pulse-echo ranging device of claim 2, wherein the limiter comprises a pair of diodes arranged in a back-to-back manner.

4. The ultrasonic pulse-echo ranging device of claim 1, wherein the first transformer has a step-up ratio from the primary winding to the secondary winding of 1:M, with M>1, and the second transformer has a step-up ratio from the secondary winding to the primary winding of 1:N, with N>1.

* * * * *